DUAL STYLUS PHONOGRAPH PICKUP

Filed March 14, 1960

INVENTORS
ANTHONY A. SARITI &
DAVID E. LAUX

BY
Eugene M. Whitacre
ATTORNEY

United States Patent Office 3,085,806

Patented Apr. 16, 1963

3,085,806

DUAL STYLUS PHONOGRAPH PICKUP

Anthony A. Sariti, Haddonfield, and David E. Laux, Medford, N.J., assignors to Radio Corporation of America, a corporation of Delaware Filed Mar. 14, 1960, Ser. No. 14,809
2 Claims. (Cl. 274—36)

This invention relates to phonograph pickups, and more particularly to dual stylus phonograph pickups for reproducing either microgroove such as 33 or 45 r.p.m. records of the wider groove 78 r.p.m. records.

The major types of phonograph records in home record libraries are 78 r.p.m. records, 33⅓ r.p.m. records and 45 r.p.m.. records. The 78 r.p.m. records have a relatively wide groove and are adapted to be reproduced by pickups having a stylus with a 3 mil radius tip. 45 and 33⅓ r.p.m. records are known as microgroove records and are adapted to be reproduced by pickups having a 1 mil radius stylus tip. In stereophonic pickups, the microgroove stylus is reduced to .7 mil radius to accommodate both the conventional monophonic microgroove records as well as the slightly smaller groove stereophonic microgroove record.

In order to play both microgroove and 78 r.p.m. records using the same pickup. it has been proposed that a pair of different size styli be provided for selective connection with the transducing system of the pickup. In other words, only one of the two styli is operable at a time, depending on the type of record being played. A pickup of this type requires a positive action stylus changeover system to insure that the selected stylus is properly located with respect to the rest of the pickup transducing system and to the record to be played. For the convenience of the user the stylus changeover system should be simple to operate, preferably being operable with only one hand.

A major problem encountered with phonograph pickups is that of stylus replacement. After some use, the stylus may wear, and be unsuitable for high quality record reproduction, while the rest of the pickup remains in good operating condition. Since the stylus represents only a portion of the total pickup cost, it is desirable to be able to replace the stylus without having to replace the entire pickup. The problem of stylus replacement is complicated by the fact that the pickup is mounted on the underside of a tone arm which usually cannot be raised high enough to see the pickup. Furthermore to insure reliable operation the stylus assembly is securely clamped in its operating position. As a result, it has been quite difficult to remove and replace the stylus assembly of dual stylus phonograph pickups provided heretofore without risk of damage to the pickup or tone arm.

Accordingly it is an object of this invention to provide an improved dual stylus phonograph pickup.

It is another object of this invention to provide a dual stylus phonograph pickup having an improved stylus changeover mechanism which may be easily operated in a positive manner by an operator using only one hand.

A further object of this invention is to provide an improved dual stylus phonograph pickup in which the stylus may be easily removed and replaced without damage to the pickup or tone arm.

A phonograph pickup in accordance with the invention includes a pair of stylus arms each carrying a different size stylus, one for 78 r.p.m. records, and one for microgroove records. One or the other of the stylus arms which are supported by a stylus supporting clip, is adapted to ride in a saddle that is mechanically coupled to the transducing portion of the pickup. The stylus supporting clip snaps into, and is held by a pivotally movable carriage. One end of the carriage is U-shaped and fits around a stud at the rear end of the pickup casing. The other end of the carriage has a carriage position locating tab that fits into a slot at the front end of the casing. A retaining spring that extends across the pickup casing holds the carriage snugly in position.

The slot in the pickup casing into which the locating tab of the carriage extends, communicates with a chamber containing a cylindrical roller cam. As the carriage is pivoted, the locating tab rides up the side of the roller cam, causing the carriage and the stylus arms to move away from the saddle. At a predetermined point, the roller cam rolls to the opposite side of the pickup casing, causing the locating tab to snap down into the slot on the other side of the roller cam. In the pivoting of the carriage; the alternate stylus arm is moved over the saddle, and when the locating arm snaps down into the slot, the second stylus arm is permitted to move into the saddle. The pivoting of the carriage may be manually effected in accordance with one embodiment of the invention, by a pair of arms that extend laterally from the carriage. In one position of the carriage, one of the arms projects slightly from one side of the tone arm, and the other of the arms is out of sight beneath the tone arm. By pushing laterally on the projecting arm, the carriage is pivoted and the styli are changed as described above. This causes the other of the arms to project from the opposite side of the tone arm, and the first arm to be withdrawn.

To remove the styli for replacement or the like, it is merely necessary to move the carriage away from the pickup housing until the locating tab is clear of the slot. The carriage may then be pulled outwardly from beneath the retaining spring. Once the carriage is removed, it is a simple operation to remove the stylus supporting clip and attached styli, and replace it with a new assembly.

The novel features that are considered to be characteristic of this invention are set forth with particularity in the appended claims. The invention itself, however, both to its organization and method of operation, as well as additional objects and advantages thereof, will best be understood from the description when read in connection with the accompanying drawings, in which:

Figures 1, 2, 3, 4:
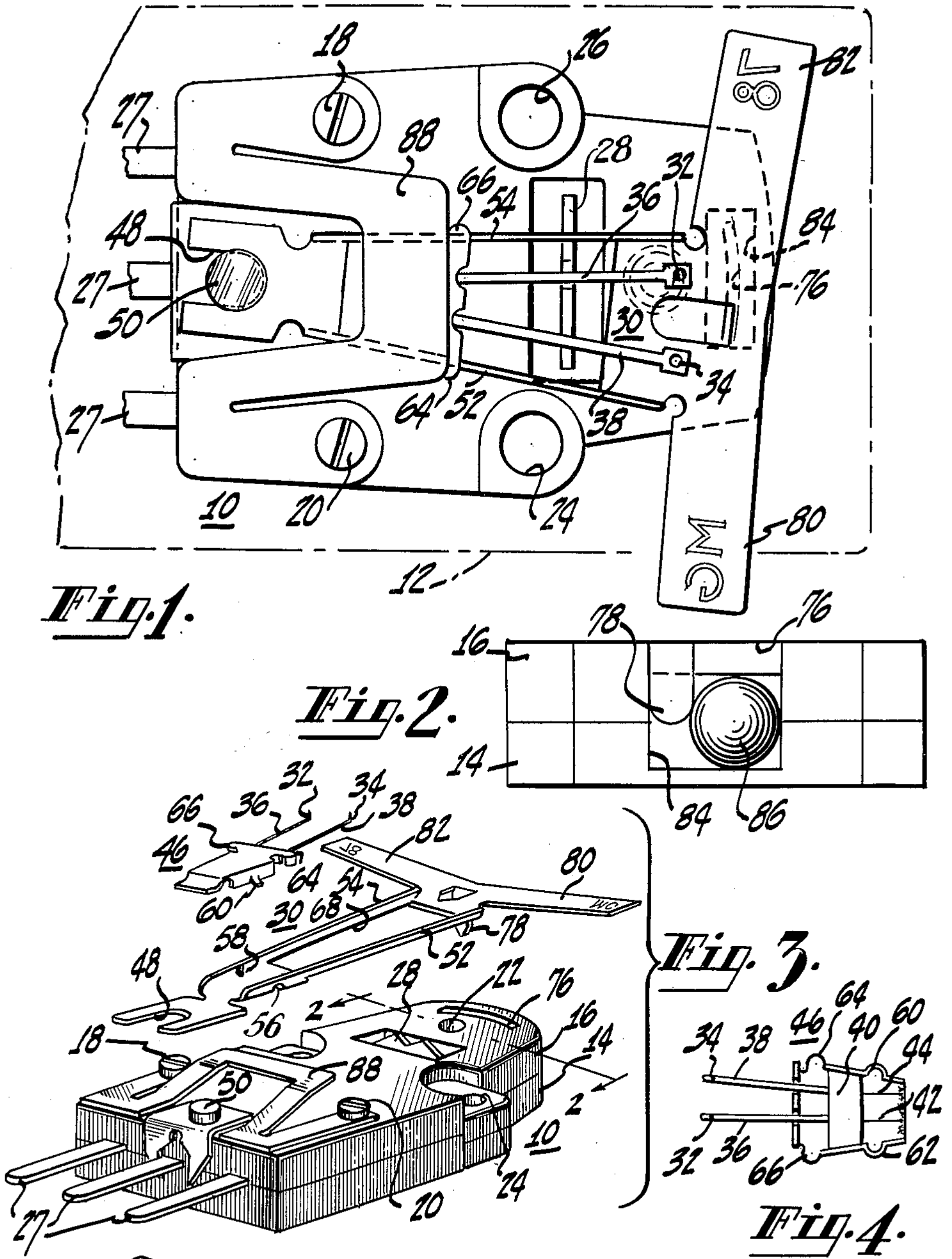
FIGURE 1 is an enlarged bottom view of a dual stylus phonograph pickup constructed in accordance with the invention.
FIGURE 2 is a sectional view taken on the section lines 2—2 of the phonograph pickup shown in FIGURE 3, and showing the positive action stylus changeover control system.
FIGURE 3 is an exploded view of a pickup in accordance with the invention inverted from its normal record playing position to show the parts which may be removed for easy changing or replacement of the styli of the dual stylus phonograph pickup of the invention.
FIGURE 4 is a top view of the snap-in stylus supporting clip.

Referring now to the drawings wherein like reference numerals will be used to designate the same components throughout, a phonograph pickup cartridge 10 constructed in accordance with the invention is adapted to be mounted near the free end of a pivotally mounted tone arm 12. The pickup cartridge 10 includes a casing comprised of a pair of molded plastic top and bottom sections 14 and 16 respectively which are held together by three screws 18, 20 and 22 as shown in FIGURE 3. The pickup cartridge is fastened in the free end of the tone arm by a pair of screws, not shown, that fit in the openings 24 and 26, and electrical connections to the pickup are made through the terminals 27 which project from the rear of the pickup cartridge 10.

The transducing mechanism of the pickup, which may comprise a stereophonic phonograph pickup, may be of the type described in the copending application of John A. Tourtellot Serial No. 717,859 filed February 27, 1958, entitled "Phonograph Pickup" and assigned to the assignee of this application. As described in the Tourtellot application, a pair of piezoelectric transducing elements are mounted in the pickup casing so that the major surfaces thereof lie in planes that intersect at right angles. The transducing elements are coupled to a yoke member 28 that has a reentrant portion for receiving the stylus arm of the pickup, so that vibrations imparted to the stylus arm may be transmitted to the transducing elements.

The stylus assembly for the pickup cartridge is mounted on a pivotally movable carriage 30, and includes a pair of styli 32 and 34 for playing different types of records. For example, the stylus 32 may have a .7 mil radius tip for use with conventional 45 r.p.m. and 33⅓ r.p.m. monophonic and stereophonic records, and the stylus 34 may have a 3 mil radius tip for use with conventional 78 r.p.m. records. The stylus 32 is supported on a flattened end of a stylus arm 36, and in like manner the stylus 34 is supported on the flattened end of a stylus arm 38. The opposite ends of the stylus arms 36 and 38, which are also flattened, are inserted into a block 40 of resilient material such as rubber that "damps" the motions of these arms and thus controls the high frequency resonance between stylus, mounting and record. The extreme rear ends of the stylus arms 36 and 38 are secured to short sections of piano wire 42 and 44 respectively, which are soldered to the rear end of the stylus supporting clip 46. Thus, these wires maintain the longitudinal and torsional position of the stylus arms with respect to the clip 46. These wires 42 and 44 also are positioned to urge the stylus arms upward toward the casing. The arm in use is urged into the re-entrant portion of the yoke, the arm not in use is urged up against the carriage 30 away from the record's surface. In this regard it is noted that the block 40 is cemented onto the stylus supporting clip 46.

The carriage 30 includes a U-shaped bearing portion 48 at one end thereof which fits about a boss 50 at the rear end of the cartridge 10. The carriage 30 has a central channel shaped portion including a pair of skirts 52 and 54 which provide protection for the stylus elements and other exposed portions of the pickup structure. The skirts 52 and 54 extend out far enough so that only a small portion of the stylus and stylus arm intended for engagement with the record groove are laterally exposed.

A pair of apertures 56 and 58 are provided near the rear portion of the carriage 30, which apertures are adapted to receive a pair of tabs 60 and 62 on the stylus supporting clip 46. It will be noted that the stylus supporting clip is tapered in a manner complementary to that of the channel portion of the carriage 30 to provide a snug fit so that once the tabs 60 and 62 have snapped through the apertures 56 and 58, the stylus supporting clip 46 is held tightly in place. The stylus supporting clip 46 also includes a pair of tabs 64 and 66 which extend outwardly therefrom and are adapted to rest on top portions of the skirts 52 and 54 to properly position clip on the carriage, and to assist in the removal of the clip from the carriage.

An opening 68 is provided in the central portion of the carriage 30 through which the yoke member 28 extends. The yoke member 28 extends sufficiently below the carriage 30 so that a stylus arm riding in the reentrant portion thereof extends clear of the pickup cartridge structure.

The extreme forward end of the carriage 30 includes a stamped out and bent up tab 78 that extends upwardly into a curved slot 76 in the pickup casing. The bent up portion which is the carriage position locating tab 78 locates the precise position of the carriage 30 for manually changing the styli. A pair of laterally extending arms 80 and 82 extend from the carriage 30 to provide a manual control member, the movement of which controls position of the carriage 30, and correspondingly which of the two styli ride in the re-entrant portion of the yoke 28.

The slot 76 communicates with a chamber 84 formed in the forward end of the pickup casing. A cylindrical roller cam 86 is mounted in the chamber 84, and provides enough room at the side thereof so that the locating tab 78 which depends from the carriage 30 may also extend into the chamber 84.

FIGURE 1 shows the stylus arm 36 which carries the 0.7 mil radius stylus tip in driving engagement with the yoke member 28. To set the pickup for playing 78 r.p.m. records, which requires a 3 mil stylus, the control arm 80 of the carriage 30 is pushed laterally causing the locating tab 78 to ride down the side of the roller cam 86 so that the carriage 30 and stylus supporting clip 46 that is carried thereby raise the .7 mil stylus arm out of the reentrant portion of the yoke 28. When the locating tab is ridden up the surface of the roller cam, the carriage 30 is pivoted laterally until the locating tab passes over dead center of the roller cam. At that time the 78 r.p.m. stylus is positioned substantially directly above the reentrant portion of the yoke 28. After sufficient movement of the carriage 30, the roller cam 86 rolls to the left as viewed in FIGURE 2, and the locating tab snaps upwardly releasing the 78 r.p.m. stylus arm into the reentrant portion of the yoke 28.

The carriage 30 is retained in the proper position by a spring 88 that extends across the pickup casing. The spring is secured to the pickup casing by the screws 18 and 20. Thus it will be seen that the clip is held against undesired movement by the boss 50 and locating tab 78. To remove the carriage 30 for stylus inspection or replacement, the carriage 30 is pulled away from the pickup casing against the force of the spring 88, until the locating tab 78 is out of the slot 76. The carriage may then be pulled out from under the spring 88. After the carriage has been removed, the stylus supporting clip 46 is readily accessible, and may be easily pried out of the carriage 30. For stylus replacement, it has been found convenient to replace the entire stylus supporting clip assembly including the two stylus arms and styli.

Figure 5:
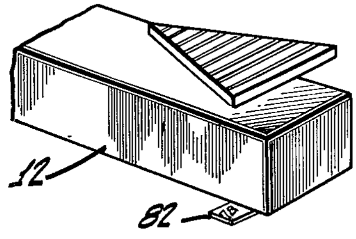
FIGURE 5 is a perspective view from the top, of a portion of the tone arm, partly broken away, including a dual stylus phonograph pickup in accordance with the invention.

A portion of a tone arm containing a pickup embodying the invention is shown in FIGURE 5. As is indicated in FIGURES 1, 3 and 5 the extreme ends of the arms 80 and 82 of the carriage 30 may be marked to indicate which of the two styli is seated in the reentrant portion of the yoke 28. As shown in FIGURE 5, the pickup is conditioned to play 78 r.p.m. records. That is, the 3 mil stylus and its supported stylus arm is positioned in the reentrant portion of the yoke 28. Although not shown in FIGURE 5, but shown in FIGURE 1, the opposite arm 80 of the carriage 30 is positioned out of sight under the tone arm. To change styli, the operator merely needs to push laterally on the arm 82 marked 78 to cause the stylus changing operation as described above, whereupon the end of the opposite arm 80, marked MG, for microgroove, extends from the opposite side of the tone arm. In this position the pickup is set to play microgroove records.

What is claimed is:

1. In a dual stylus phonograph pickup comprising in combination, a pickup casing, driving means for a transducing system extending from said casing, a carriage member having a U-shaped bearing portion at one end thereof and a locating tab extending upwardly therefrom at the other end thereof, a boss on said pickup casing to serve as a pivot for said bearing portion, and a slot in said pickup casing communicating with a substantially closed chamber in said casing, the locating tab of said carriage member adapted to extend through said slot into said chamber, spring means for holding said carriage member in position against said pickup casing, a stylus supporting clip including a pair of generally parallel but spaced stylus arms, means for detachably mounting said stylus supporting clip on said carriage member so that one of said stylus arms engages said driving member, a roller cam in said chamber and held at one side of the chamber by said locating tab, said locating tab adapted to ride up the side of said roller cam upon the initial pivoting of said carriage member thereby causing said other end of said carriage to be moved away from said pickup casing and causing said one of said stylus arms to move away from said driving member, the other of said stylus arms adapted to be moved into alignment with said driving means by further pivotal movement of said carriage member and moved into engagement with said driving member when said roller cam snaps to the opposite side of said chamber and said locating tab moves back into said chamber, said carriage member being readily removable from the remainder of said phonograph pickup by moving said carriage member against the force of said spring means until said locating tab is out of the slot in said pickup casing, and then removing said carriage member.

2. In a dual stylus phonograph pickup comprising in combination a pickup casing, driving means for a transducing system extending from said casing, a pivotally mounted carriage member having a locating tab extending therefrom, a slot in said pickup casing communicating with a substantially closed chamber in said casing, the locating tab of said carriage member adapted to extend through said slot into said chamber, spring means for holding said carriage member in position against said pickup casing, a stylus for tracing 78 r.p.m. records supported on a first stylus arm, and a stylus for tracing microgroove records supported on a second stylus arm, said first and second stylus arms mounted in generally parallel relation on said carriage member so that one of said first and second stylus arms engages said driving means, a roller cam in said chamber, and held at one side of the chamber by said locating tab, said locating tab adapted to ride up the side of said roller cam upon the initial pivoting of said carriage member thereby causing said carriage member to be moved away from said pickup casing and causing said one of said stylus arms to move away from said driving member, the other of said stylus arms adapted to be moved into alignment with said driving means by further pivotal movement of said carriage member, and moved into engagement with said driving member when said roller cam snaps to the opposite side of said chamber and said locating tab moves back into said chamber on the opposite side of said roller cam.

References Cited in the file of this patent

UNITED STATES PATENTS

| | | |
|---|---|---|
| 536,414 | Bailey | Mar. 26, 1895 |
| 2,558,502 | Williams | June 26, 1951 |
| 2,816,056 | Harris | Dec. 10, 1957 |
| 2,900,452 | Bauer et al. | Aug. 18, 1959 |